United States Patent
Nishidai et al.

(10) Patent No.: US 9,963,108 B2
(45) Date of Patent: May 8, 2018

(54) VEHICLE CONTROL SYSTEM

(71) Applicants: Tetsuo Nishidai, Aichi (JP); Naoyuki Ishihara, Aichi (JP); Yosuke Tomita, Aichi (JP)

(72) Inventors: Tetsuo Nishidai, Aichi (JP); Naoyuki Ishihara, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days. days.

(21) Appl. No.: 15/427,469

(22) Filed: Feb. 8, 2017

(65) Prior Publication Data

US 2017/0232933 A1 Aug. 17, 2017

(30) Foreign Application Priority Data

Feb. 12, 2016 (JP) ................................ 2016/025000

(51) Int. Cl.
*B60R 25/24* (2013.01)

(52) U.S. Cl.
CPC ........ B60R 25/24 (2013.01); *B60R 2325/205* (2013.01)

(58) Field of Classification Search
CPC .......................... B60R 25/24; B60R 2325/205
USPC .................................. 340/5.61, 5.72, 426.36
See application file for complete search history.

(56) References Cited

U.S. PATENT DOCUMENTS

| | | | | |
|---|---|---|---|---|
| 6,396,412 B1* | 5/2002 | Banas | ................... | B60R 25/246 340/426.35 |
| 6,670,883 B1* | 12/2003 | Asakura | ................. | B60R 25/24 307/10.1 |
| 2001/0054952 A1* | 12/2001 | Desai | ..................... | E05B 77/48 340/5.72 |
| 2005/0275511 A1* | 12/2005 | Luo | ........................ | B60R 25/00 340/426.17 |
| 2006/0091997 A1* | 5/2006 | Conner | ............... | B60R 25/1003 340/5.64 |
| 2006/0273888 A1* | 12/2006 | Yamamoto | .............. | B60R 25/24 340/426.36 |
| 2007/0046232 A1* | 3/2007 | Mullet | ............... | G07C 9/00309 318/280 |

(Continued)

FOREIGN PATENT DOCUMENTS

JP 2001-090402 A 4/2001

*Primary Examiner* — Edwin Holloway, III
(74) *Attorney, Agent, or Firm* — Osha Liang LLP

(57) ABSTRACT

A vehicle control system includes a vehicle control apparatus, a first portable device, and a second portable device. The first portable device transmits a first signal to the vehicle control apparatus based on the fact that a first operation by a user is performed on the second portable device. When the vehicle control apparatus receives the first signal from the first portable device, the vehicle control apparatus intermittently transmits a second signal to the first portable device. The first portable device measures a signal strength of the second signal received from the vehicle control apparatus, based on the fact that a second operation by the user is performed on the second portable device after the first operation. The vehicle control apparatus or the first portable device sets, as a distance threshold, a distance between the first portable device and the vehicle calculated from the measured signal strength.

10 Claims, 12 Drawing Sheets

(56) References Cited

U.S. PATENT DOCUMENTS

| | | | |
|---|---|---|---|
| 2011/0257817 A1* | 10/2011 | Tieman | B60R 25/24 701/2 |
| 2012/0092129 A1* | 4/2012 | Lickfelt | B60R 25/24 340/5.72 |
| 2012/0244877 A1* | 9/2012 | Margalef | G01S 5/0252 455/456.1 |
| 2015/0048927 A1* | 2/2015 | Simmons | G07C 9/00309 340/5.61 |

* cited by examiner

VEHICLE CONTROL SYSTEM

CROSS-REFERENCE TO RELATED APPLICATION

This application is based on Japanese Patent Application No. 2016-025000 filed with the Japan Patent Office on Feb. 12, 2016, the entire contents of which are incorporated herein by reference.

FIELD

The disclosure relates to a vehicle control system that controls the operation of a vehicle by performing wireless communication between a portable device carried by a user of the vehicle and a control apparatus included in the vehicle.

BACKGROUND

A vehicle control system that automatically unlocks doors when a user approaches a vehicle and automatically locks the doors when the user walks away from the vehicle has been put into practical use. The system includes a vehicle control apparatus mounted on the vehicle; and a portable device carried by the user.

The vehicle control apparatus transmits a response request signal in a predetermined cycle, and the user's portable device receives the response request signal. When the user approaches the vehicle and the portable device receives a response request signal of a certain level or higher, the portable device sends a response signal including an ID code back to the vehicle control apparatus. When the vehicle control apparatus receives the response signal, the vehicle control apparatus authenticates the ID code. If the authentication result is normal, then the vehicle control apparatus performs control to, for example, unlock the vehicle doors and turn on lighting that illuminates an area around the user's feet near the doors. A function of, for example, thus automatically unlocking the doors and automatically turning on the lighting when the user approaches the vehicle is called "welcome entry", and referred to as "WE" in the following.

On the other hand, when the user gets out and walks away from the vehicle and the strength of the response request signal received by the portable device is reduced to a predetermined value, the portable device stops the sending back of the response signal. When the vehicle control apparatus determines that the response signal from the portable device has been stopped, the vehicle control apparatus locks the vehicle doors. A function of thus automatically locking the doors when the user walks away from the vehicle is called "walk away lock", and referred to as "WAL" in the following.

JP 2001-90402 A describes a vehicle control system including the WE and WAL functions such as those described above. In this system, when a user carrying a portable device walks away from a vehicle, doors are locked at a point in time when the user has walked away to a position within a relatively short distance from the vehicle (WAL), and when the user approaches the vehicle, the doors are unlocked at a point in time when the user has approached a position within a relatively long distance from the vehicle (WE). By this, the user having got out of the vehicle can easily check the locking of the doors near the vehicle, and for the user rushing to the vehicle, the doors can be unlocked in good time.

However, in the conventional vehicle control system, a distance between the portable device and the vehicle at a point in time when the doors are unlocked in WE and a distance between the portable device and the vehicle at a point in time when the doors are locked in WAL are both fixed values which are preset as threshold values. Therefore, the user cannot freely change the distances.

SUMMARY

An object of the disclosure is to provide a vehicle control system capable of easily customizing distance thresholds which are used for vehicle control, such as locking and unlocking of doors, in accordance with user's wises.

A vehicle control system according to one or more embodiments of the disclosure includes a vehicle control apparatus mounted on a vehicle; and a portable device carried by a user. The vehicle control system performs wireless communication between the vehicle control apparatus and the portable device, compares a distance between the portable device and the vehicle with a predetermined distance threshold, and controls the vehicle by the vehicle control apparatus based on a result of the comparison, the distance being calculated from a strength of a signal received by the portable device. The portable device includes a first portable device configured to perform communication with the vehicle control apparatus; and a second portable device configured to perform communication with the first portable device. The first portable device transmits a first signal to the vehicle control apparatus based on a fact that a first operation by the user is performed on the second portable device, the first signal requesting to transmit a second signal. When the vehicle control apparatus receives the first signal from the first portable device, the vehicle control apparatus intermittently transmits the second signal to the first portable device. The first portable device measures a signal strength of the second signal received from the vehicle control apparatus, based on a fact that a second operation by the user is performed on the second portable device after the first operation. The vehicle control apparatus or the first portable device sets, as the distance threshold, a distance between the first portable device and the vehicle calculated from the measured signal strength.

According to the vehicle control system, for example, when a distance threshold for locking or unlocking a door of the vehicle is customized, the user performs the first operation on the second portable device, and then moves to a position where the door is to be locked or unlocked. Then, when the user performs the second operation on the second portable device at that position, the distance threshold is automatically set based on a signal strength measured by the first portable device. Hence, a distance threshold that meets a user's wish can be easily set without performing complex operations.

In one or more embodiments of the disclosure, it may be configured such that when the first operation is performed on the second portable device, the second portable device transmits the first signal to the vehicle control apparatus through the first portable device, when the second operation is performed on the second portable device, the second portable device transmits a third signal to the first portable device, and when the first portable device receives the third signal from the second portable device, the first portable device measures a signal strength of the second signal.

In one or more embodiments of the disclosure, the vehicle control apparatus or the first portable device may calculate a distance between the first portable device and the vehicle based on the measured signal strength; set, as a first distance threshold, a distance between the first portable device and the vehicle obtained at a point in time when the vehicle control apparatus locks a door of the vehicle; and set, as a second distance threshold, a distance between the first portable device and the vehicle obtained at a point in time when the vehicle control apparatus unlocks the door of the vehicle.

In one or more embodiments of the disclosure, the second portable device may include: a first selecting portion configured to select setting of the first distance threshold; a second selecting portion configured to select setting of the second distance threshold; a first setting portion configured to allow the first distance threshold to be stored; and a second setting portion configured to allow the second distance threshold to be stored, the first operation may be performed by the first selecting portion or the second selecting portion, and the second operation may be performed by the first setting portion or the second setting portion.

In one or more embodiments of the disclosure, the first portable device may be an electronic key for locking or unlocking a door of the vehicle, and the second portable device may be a smartphone that performs near-field wireless communication with the first portable device.

In one or more embodiments of the disclosure, the first portable device and the second portable device may be integrated. In this case, a vehicle control system includes a vehicle control apparatus and a single portable device carried by a user. The portable device transmits a first signal to the vehicle control apparatus based on a fact that a first operation by the user is performed, the first signal requesting to transmit a second signal. When the vehicle control apparatus receives the first signal from the portable device, the vehicle control apparatus intermittently transmits the second signal to the portable device. The portable device measures a signal strength of the second signal received from the vehicle control apparatus, based on a fact that a second operation by the user is performed after the first operation. The vehicle control apparatus or the portable device sets, as a distance threshold, a distance between the portable device and the vehicle calculated from the measured signal strength.

The vehicle control apparatus or the portable device may calculate a distance between the portable device and the vehicle based on the measured signal strength; set, as a first distance threshold, a distance between the portable device and the vehicle obtained at a point in time when the vehicle control apparatus locks a door of the vehicle; and set, as a second distance threshold, a distance between the portable device and the vehicle obtained at a point in time when the vehicle control apparatus unlocks the door of the vehicle.

In addition, the portable device may include: a first selecting portion configured to select setting of the first distance threshold; a second selecting portion configured to select setting of the second distance threshold; a first setting portion configured to allow the first distance threshold to be stored; and a second setting portion configured to allow the second distance threshold to be stored, the first operation may be performed by the first selecting portion or the second selecting portion, and the second operation may be performed by the first setting portion or the second setting portion.

In addition, the portable device may be a smartphone or may be an electronic key for locking or unlocking a door of the vehicle.

According to one or more embodiments of the disclosure, a vehicle control system can be provided that is capable of easily customizing distance thresholds which are used for vehicle control, such as locking and unlocking of doors, in accordance with user's wises.

DETAILED DESCRIPTION

Figure 1A:
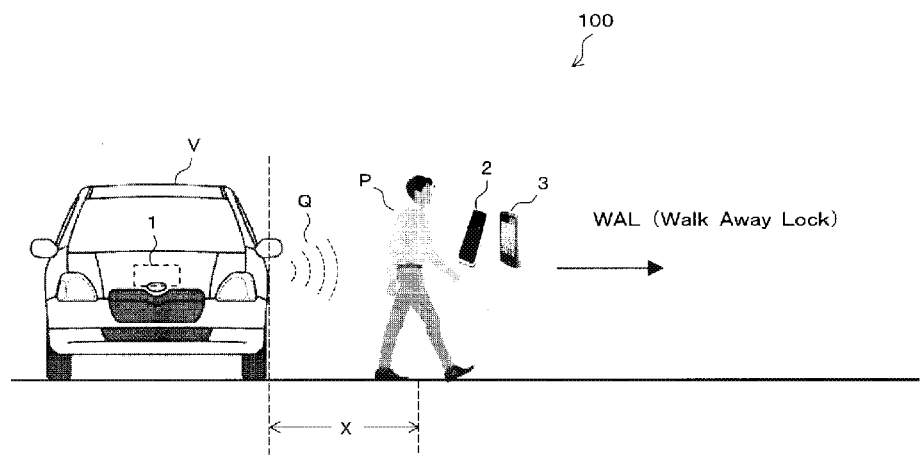
FIGS. 1A and 1B are schematic diagrams of a vehicle control system according to a first embodiment.

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First Embodiment

Figure 1B:
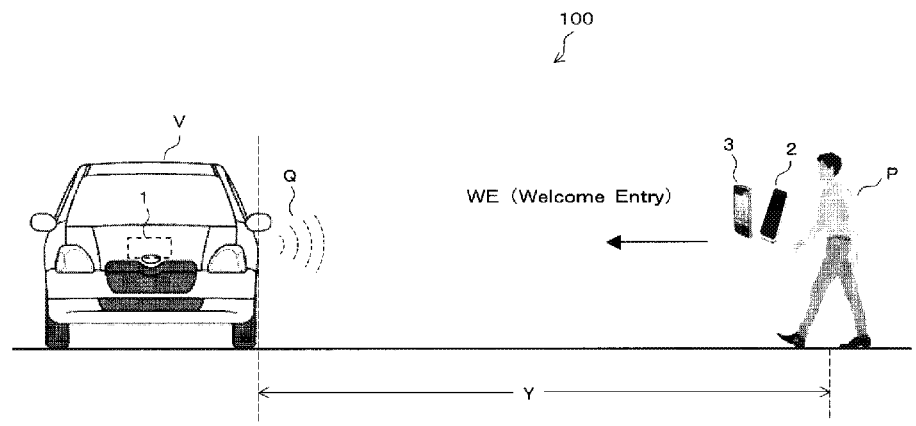

A configuration of a vehicle control system according to a first embodiment will be described with reference to FIGS. 1A and 1B and 2. As shown in FIGS. 1A and 1B, a vehicle control system 100 includes a vehicle control apparatus 1 mounted on a vehicle V; an electronic key 2 that performs wireless communication with the vehicle control apparatus 1; and a smartphone 3 that performs wireless communication with the electronic key 2. The electronic key 2 and the smartphone 3 are carried by a user (passenger) P of the vehicle V.

Here, the electronic key 2 is an example of a "first portable device" of the disclosure, and the smartphone 3 is an example of a "second portable device" of the disclosure.

FIG. 1A shows a case of the aforementioned WAL (Walk Away Lock) where the vehicle control apparatus 1 automatically locks doors of the vehicle V by the user P getting out and moving away from the vehicle V. Here, when it is assumed that the doors of the vehicle V are locked at a point in time when the user P has walked away to a position away by a distance X from the vehicle V, in the conventional system, the value of the distance X which is a threshold is a preset, fixed value. On the other hand, the system of the disclosure can arbitrarily set the value of the distance X in accordance with a user P's wish, using the smartphone 3. Namely, a distance between the portable device and the vehicle at a point in time when the doors are locked in WAL (hereinafter, referred to as "WAL distance threshold") can be customized, a detail of which will be described later. A summary is as follows.

When the WAL distance threshold is customized, the user P starts an application for customization by operating the smartphone 3 at a position near the vehicle V, and selects WAL distance setting from a menu displayed on a screen. By doing so, the vehicle control apparatus 1 periodically transmits a signal Q for distance measurement. Thereafter, when the user P walks away from the vehicle V, carrying the electronic key 2 and the smartphone 3, and reaches a position the doors are to be locked, the user P performs an operation to set the distance on the screen of the smartphone 3. By doing so, the electronic key 2 measures the strength of the signal Q received from the vehicle control apparatus 1, and a distance X between the electronic key 2 and the vehicle V calculated based on the strength of the signal Q is stored, as a WAL distance threshold, in the vehicle control apparatus 1 or in the electronic key 2. By this, the WAL distance threshold that meets the user P's wish is set, and WAL operation based on the distance threshold is performed thereafter. Namely, the doors of the vehicle V are automatically locked at a point in time when the user P has got out of the vehicle V and walked away to a position away by the distance X from the vehicle V.

FIG. 1B shows a case of the aforementioned WE (Welcome Entry) where the vehicle control apparatus 1 automatically unlocks the doors of the vehicle V by the user P approaching the vehicle V. Here, when it is assumed that the doors of the vehicle V are unlocked at a point in time when the user P has approached a position away by a distance Y from the vehicle V, in the conventional system, the value of the distance Y which is a threshold is a preset, fixed value. On the other hand, the system of the disclosure can arbitrarily set the value of the distance Y in accordance with a user P's wish, using the smartphone 3. Namely, a distance between the portable device and the vehicle at a point in time when the doors are unlocked in WE (hereinafter, referred to as "WE distance threshold") can be customized, a detail of which will be described later. A summary is as follows.

When the WE distance threshold is customized, the user P starts the application for customization by operating the smartphone 3 at a position relatively far from the vehicle V, and selects WE distance setting from a menu displayed on a screen. By doing so, the vehicle control apparatus 1 periodically transmits a signal Q for distance measurement. Thereafter, when the user P approaches the vehicle V, carrying the electronic key 2 and the smartphone 3, and reaches a position where the doors are to be unlocked, the user P performs an operation to set the distance on the screen of the smartphone 3. By doing so, the electronic key 2 measures the strength of the signal Q received from the vehicle control apparatus 1, and a distance Y between the electronic key 2 and the vehicle V calculated based on the strength of the signal Q is stored, as a WE distance threshold, in the vehicle control apparatus 1 or in the electronic key 2. By this, the WE distance threshold that meets the user P's wish is set, and WE operation based on the distance threshold is performed thereafter. Namely, the doors of the vehicle V are automatically unlocked at a point in time when the user P has approached a position away by the distance Y from the vehicle V.

Figure 2:
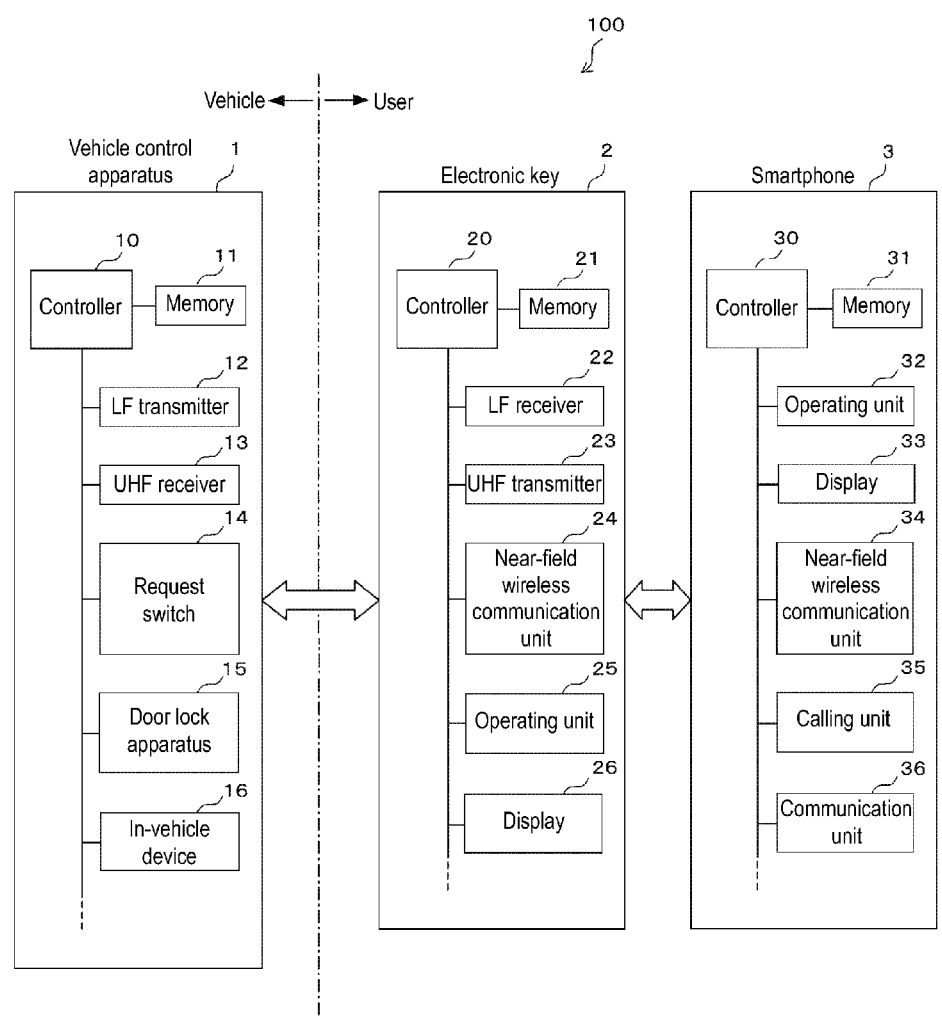
FIG. 2 is a block diagram of the vehicle control system according to the first embodiment.

FIG. 2 shows specific configurations of the vehicle control apparatus 1, the electronic key 2, and the smartphone 3, each of which will be described in detail below.

The vehicle control apparatus 1 includes a controller 10, a memory 11, an LF (Low Frequency) transmitter 12, a UHF (Ultra High Frequency) receiver 13, a request switch 14, a door lock apparatus 15, and an in-vehicle device 16. Although the vehicle control apparatus 1 includes various types of blocks in addition to those, they are not directly related to the disclosure and thus are not shown. Note that the vehicle control system 100 of FIG. 2 is not only a keyless entry system that performs the locking or unlocking of the doors by operating the electronic key 2, but also a passive entry system that performs the locking or unlocking of the doors by performing communication between the vehicle control apparatus 1 and the electronic key 2 when the user has approached or touched a door knob.

The controller 10 includes a CPU and controls the operation of the vehicle control apparatus 1. The memory 11 includes memories such as a ROM and a RAM. The LF transmitter 12 transmits a signal Q for distance measurement shown in FIGS. 1A and 1B. The signal Q is an LF (low frequency) signal and is intermittently transmitted in a predetermined cycle. The UHF receiver 13 receives a UHF signal (described later) which is transmitted from the electronic key 2. The request switch 14 forms a passive entry system, together with the electronic key 2. The request switch 14 is provided near the door knob and detects a user's approach or touch. The door lock apparatus 15 includes, for example, a lock mechanism that locks and unlocks the doors; and a drive circuit that allows the lock mechanism to operate. The in-vehicle device 16 includes lighting, an air conditioning apparatus, an audio apparatus, a car navigation apparatus, etc.

The electronic key 2 includes a controller 20, a memory 21, an LF receiver 22, a UHF transmitter 23, a near-field wireless communication unit 24, an operating unit 25, and a display 26. Although the electronic key 2 also includes other blocks than those, they are not directly related to the disclosure and thus are not shown.

The controller 20 includes a CPU and controls the operation of the electronic key 2. The memory 21 includes memories such as a ROM and a RAM. The LF receiver 22 receives a signal Q for distance measurement which is transmitted from the LF transmitter 12 of the vehicle control apparatus 1. The UHF transmitter 23 transmits commands (described later) to the vehicle control apparatus 1 by UHF communication. The near-field wireless communication unit 24 includes a communication circuit for near-field wireless communication such as a wireless LAN or Bluetooth (registered trademark). The operating unit 25 includes a plurality of operating buttons provided to a main body of the electronic key 2. The display 26 includes a plurality of LED lamps provided to the main body of the electronic key 2.

The smartphone 3 includes a controller 30, a memory 31, an operating unit 32, a display 33, a near-field wireless communication unit 34, a calling unit 35, and a communication unit 36. Although the smartphone 3 includes various types of blocks in addition to those, they are not directly related to the disclosure and thus are not shown.

The controller 30 includes a CPU and controls the operation of the smartphone 3. The memory 31 includes memories such as a ROM and a RAM. The operating unit 32 includes operating buttons provided to a main body of the smartphone 3 and operating buttons displayed on the display 33. The display 33 includes, for example, a liquid crystal panel provided to the main body of the smartphone 3 and a drive circuit for the liquid crystal panel. The near-field wireless communication unit 34 includes a communication circuit which is the same as that of the near-field wireless communication unit 24 of the electronic key 2. The calling unit 35 includes a speaker, a microphone, an audio circuit, and the like. The communication unit 36 includes a communication circuit that is connected to an Internet line to perform communication with a server, etc.

Next, detailed procedural steps taken when the vehicle control system 100 configured in the above-described manner customizes the WAL distance threshold and the WE distance threshold will be described with reference to a flowchart of FIG. 3. Note that a condition for customization of the distance thresholds is that the user P carries both the electronic key 2 and the smartphone 3.

Figure 4A:
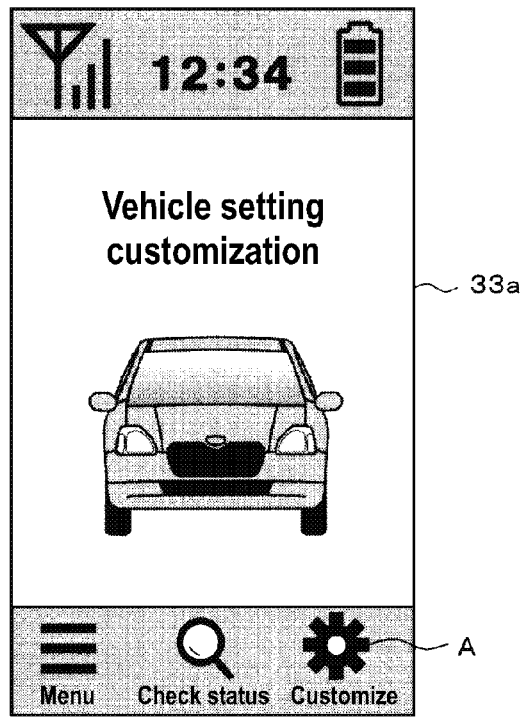
FIG. 4A is a diagram showing an initial screen of a portable device.
Figure 4B:
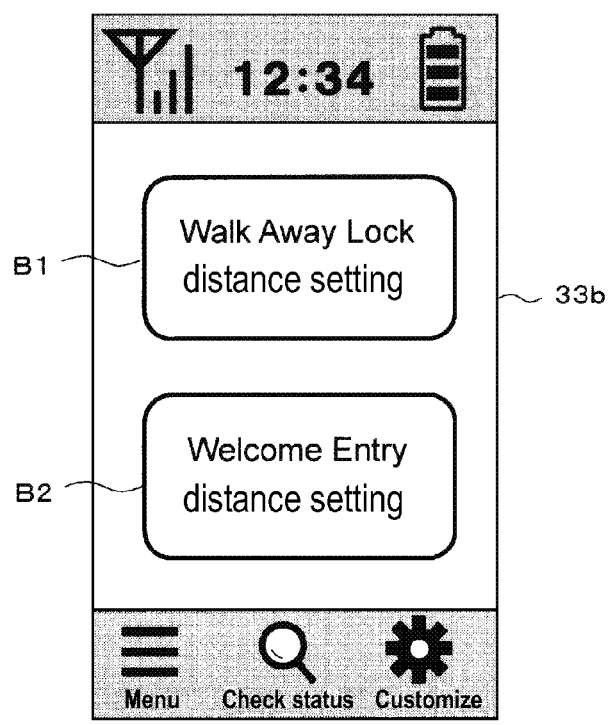
FIG. 4B is a diagram showing a selection screen of the portable device.

First, procedural steps for customizing the WAL distance threshold, i.e., a distance threshold for door locking, will be described. In this case, the user P starts an application for customization by operating the smartphone 3 at a position near the vehicle V (step S301). By doing so, an initial screen 33a such as that shown in FIG. 4A is displayed on the display 33 of the smartphone 3 (step S302). Subsequently, when the user P presses a customize button A displayed on the initial screen 33a (step S303), the screen on the display 33 changes to a selection screen 33b such as that shown in FIG. 4B (step S304). The selection screen 33b displays buttons B1 and B2 for selecting a setting target. The button B1 is a WAL distance setting button for setting the WAL distance threshold, and the button B2 is a WE distance setting button for setting the WE distance threshold.

Here, the WAL distance setting button B1 is an example of a "first selecting portion" in one or more embodiments of the disclosure, and the WE distance setting button B2 is an example of a "second selecting portion" in one or more embodiments of the disclosure. In addition, the WAL distance threshold is an example of a "first distance threshold" in one or more embodiments of the disclosure, and the WE distance threshold is an example of a "second distance threshold" in one or more embodiments of the disclosure.

By the user P selecting a setting target by pressing the WAL distance setting button B1 on the selection screen 33b (step S305), the near-field wireless communication unit 34 of the smartphone 3 transmits a customize start command that instructs to start the setting of the WAL distance threshold, to the near-field wireless communication unit 24 of the electronic key 2 (step S306). When the electronic key 2 receives the customize start command by the near-field wireless communication unit 24 (step S201), the electronic key 2 transmits the customize start command, as a UHF signal, from the UHF transmitter 23 to the vehicle control apparatus 1 (step S202).

Here, the pressing of the WAL distance setting button B1 is an example of a "first operation" in one or more embodiments of the disclosure, and the customize start command is an example of a "first signal" in one or more embodiments of the disclosure.

When the vehicle control apparatus 1 receives, by the UHF receiver 13, the customize start command transmitted from the electronic key 2 (step S101), the controller 10 sets a customize setting mode to ON (step S102). By this, the LF transmitter 12 starts the operation of intermittently transmitting an LF signal Q for distance measurement in a predetermined cycle (step S103). The LF signal Q is intermittently received by the LF receiver 22 of the electronic key 2 in the predetermined cycle (step S203).

Here, the LF signal Q is an example of a "second signal" in one or more embodiments of the disclosure.

Figure 4C:
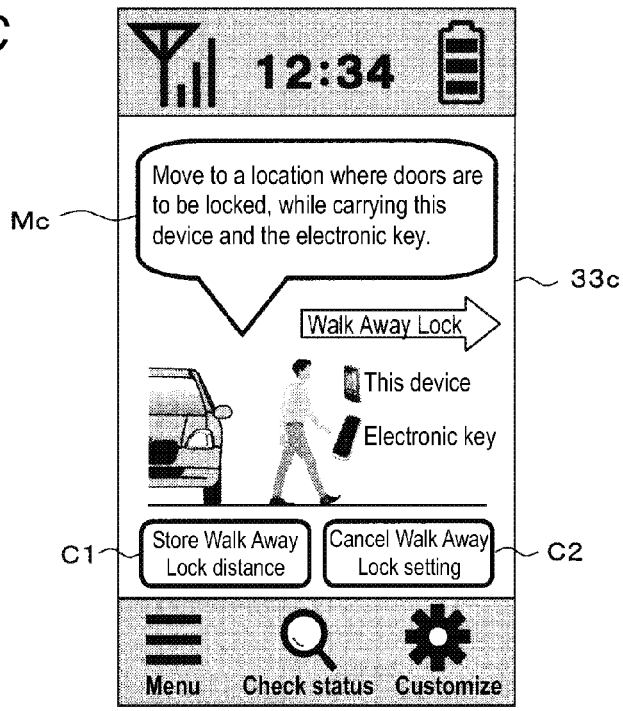
FIG. 4C is a diagram showing a WAL navigation screen of the portable device.

On the other hand, on the smartphone 3, by the selection of the WAL distance setting at step S305, the screen on the display 33 changes to a WAL navigation screen 33c such as that shown in FIG. 4C (step S307). The WAL navigation screen 33c displays a message Mc prompting the user P to move to a location where the doors are to be locked, while carrying the smartphone 3 and the electronic key 2, and a WAL distance storing button C1 and a WAL setting cancel button C2.

Here, the WAL distance storing button C1 is an example of a "first setting portion" in one or more embodiments of the disclosure.

When, by following the message Mc, the user P walks away from the vehicle V, carrying the electronic key 2 and the smartphone 3 and reaches a position where the doors are to be locked, as shown in FIG. 1A, the user P presses the WAL distance storing button C1 (step S308). By doing so, the near-field wireless communication unit 34 of the smartphone 3 transmits a customize complete command that instructs to complete the setting of the WAL distance threshold, to the near-field wireless communication unit 24 of the electronic key 2 (step S309). When the electronic key 2 receives the customize complete command by the near-field wireless communication unit 24 (step S204), the electronic key 2 measures the strength of the LF signal Q received from the vehicle control apparatus 1 and computes, based on the signal strength, a distance set by the user P, i.e., a distance from the current position of the user P (electronic key 2) to the vehicle V (step S205). Thereafter, the electronic key 2 transmits the received customize complete command and the calculated set distance, as a UHF signal, from the UHF transmitter 23 to the vehicle control apparatus 1 (step S206).

Here, the pressing of the WAL distance storing button C1 is an example of a "second operation" in one or more embodiments of the disclosure, and the customize complete command is an example of a "third signal" in one or more embodiments of the disclosure.

When the vehicle control apparatus 1 receives, by the UHF receiver 13, the customize complete command and set distance transmitted from the electronic key 2 (step S104), the controller 10 sets the customize setting mode to OFF (step S105). By this, the LF transmitter 12 stops the transmission of the LF signal Q. In addition, the set distance received from the electronic key 2 is stored as the WAL distance threshold in the memory 11 (step S106). Thereafter, WAL operation is performed using that WAL distance threshold. When the WAL distance threshold is X, the doors are automatically locked by the door lock apparatus 15 at a point in time when the user P has got out of the vehicle V and walked away to a position away by the distance X from the vehicle V.

Figure 4D:
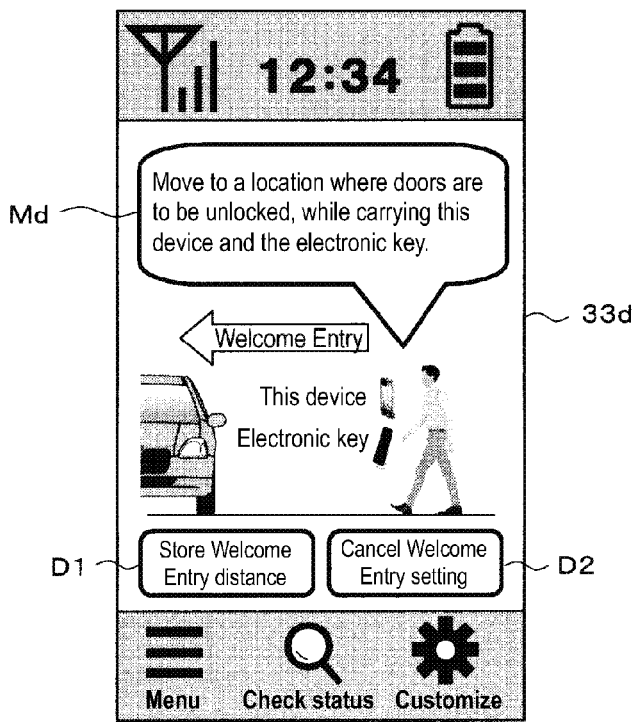
FIG. 4D is a diagram showing a WE navigation screen of the portable device.
Figure 4E:
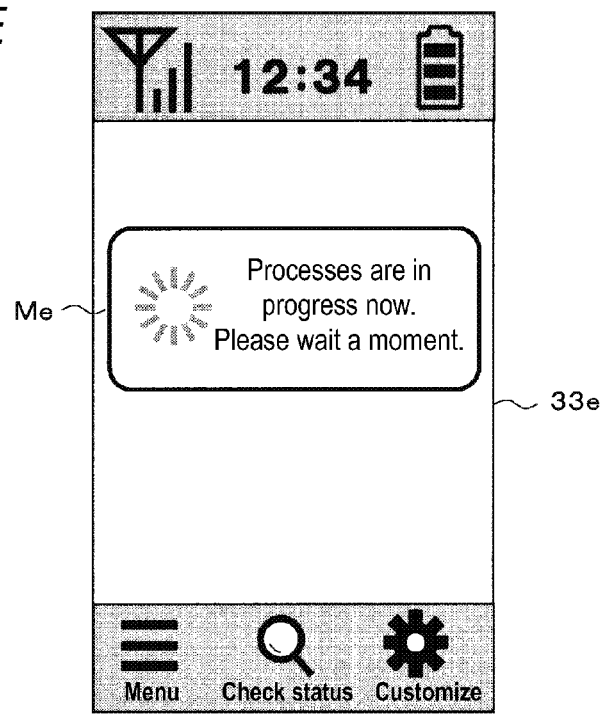
FIG. 4E is a diagram showing a processing screen of the portable device.

On the other hand, the smartphone 3 displays a processing screen 33e such as that shown in FIG. 4E while the electronic key 2 performs the processes at steps S204 to S206 (step S310). The screen displays a message Me notifying that the processes are in progress. In addition, when the electronic key 2 completes the transmission at step S206, the electronic key 2 transmits a setting completion notification indicating the completion of the setting of the distance threshold, from the near-field wireless communication unit 24 to the near-field wireless communication unit 34 of the smartphone 3 (step S207). Then, when the near-field wireless communication unit 34 of the smartphone 3 receives the setting completion notification (step S311), the screen on the display 33 changes to a setting completion notification screen 33f such as that shown in FIG. 4F (step S312). The screen displays a message Mf notifying the completion of the setting.

Figure 4F:
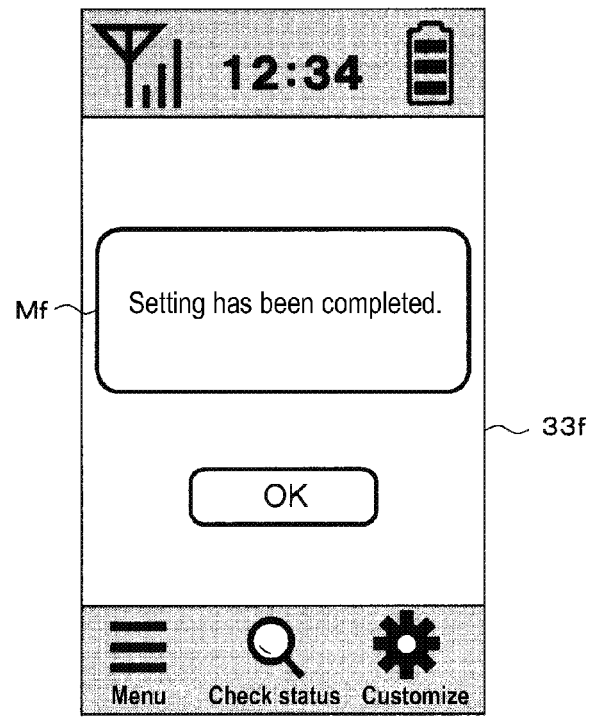
FIG. 4F is a diagram showing a setting completion notification screen of the portable device.
Figure 4G:
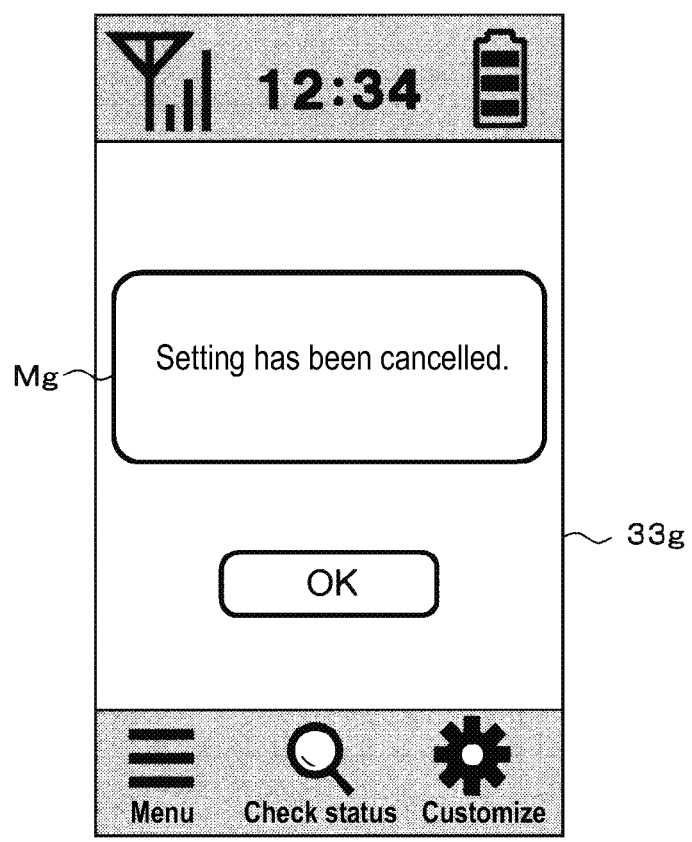
FIG. 4G is a diagram showing a setting cancellation notification screen of the portable device.

Note that when the user P presses the WAL setting cancel button C2 on the WAL navigation screen 33c of FIG. 4C (step S313), the screen of the smartphone 3 changes to a setting cancellation notification screen 33g such as that shown in FIG. 4G (step S314). The screen displays a message Mg notifying the cancellation of the setting.

Next, procedural steps for customizing the WE distance threshold, i.e., a distance threshold for door unlocking, will be described. In this case, the user P operates the smartphone 3 at a position relatively far from the vehicle V. The procedural steps S301 to S304 of FIG. 3 are the same as those for the case of WAL. At step S305, the WE distance setting button B2 is pressed on the selection screen 33b of FIG. 4B. By doing so, the near-field wireless communication unit 34 transmits a customize start command that instructs to start the setting of the WE distance threshold (step S306). Subsequent operation of the electronic key 2 and the vehicle control apparatus 1 that have received the customize start command (steps S201 to S207 and steps S101 to S106) is basically the same as that for the case of WAL except that WAL is changed to WE, and thus, description thereof is omitted.

Here, the pressing of the WE distance setting button B2 is an example of the "first operation" in one or more embodiments of the disclosure, and the customize start command is an example of the "first signal" in one or more embodiments of the disclosure.

On the smartphone 3, by the selection of the WE distance setting at step S305, the screen on the display 33 changes to a WE navigation screen 33d such as that shown in FIG. 4D (step S307). The WE navigation screen 33d displays a message Md prompting the user P to move to a location where the doors are to be unlocked, while carrying the smartphone 3 and the electronic key 2, and a WE distance storing button D1 and a WE setting cancel button D2.

Here, the WE distance storing button D1 is an example of a "second setting portion" in one or more embodiments of the disclosure.

When, by following the message Md, the user P approaches the vehicle V, carrying the electronic key 2 and the smartphone 3 and reaches a position where the doors are to be unlocked, as shown in FIG. 1B, the user P presses the WE distance storing button D1 (step S308). Subsequent steps S309 to S312 are the same as those for the case of WAL. Namely, after the near-field wireless communication unit 34 transmits a customize complete command that instructs to complete the setting of the WE distance threshold (step S309), the screen on the display 33 changes to the processing screen 33e of FIG. 4E (step S310). When a setting completion notification is received from the electronic key 2 (step S311), the screen on the display 33 changes to the setting completion notification screen 33f of FIG. 4F (step S312).

Here, the pressing of the WE distance storing button D1 is an example of the "second operation" in one or more embodiments of the disclosure, and the customize complete command is an example of the "third signal" in one or more embodiments of the disclosure.

In addition, when the user P presses the WE setting cancel button D2 on the WE navigation screen 33d of FIG. 4D (step S313), the screen on the display 33 changes to the setting cancellation notification screen 33g of FIG. 4G (step S314).

According to the first embodiment, the user P can easily set the WAL distance threshold or the WE distance threshold that meets his/her wish only by pressing the WAL distance setting button B1 or the WE distance setting button B2 on the smartphone 3 and then moving to a position where the doors of the vehicle V are to be locked or unlocked, and pressing, at that position, the WAL distance storing button C1 or the WE distance storing button D1 on the smartphone 3.

In addition, in the first embodiment, since the electronic key 2 and the smartphone 3 are used as portable devices and a signal is transmitted from the smartphone 3 to the vehicle control apparatus 1 through the electronic key 2, the electronic key 2 serves as a gateway. Hence, compared to a case in which a signal is directly transmitted to the vehicle control apparatus 1 from the smartphone 3 connected to the Internet, security performance on the vehicle side can be enhanced.

Second Embodiment

Figure 5A:
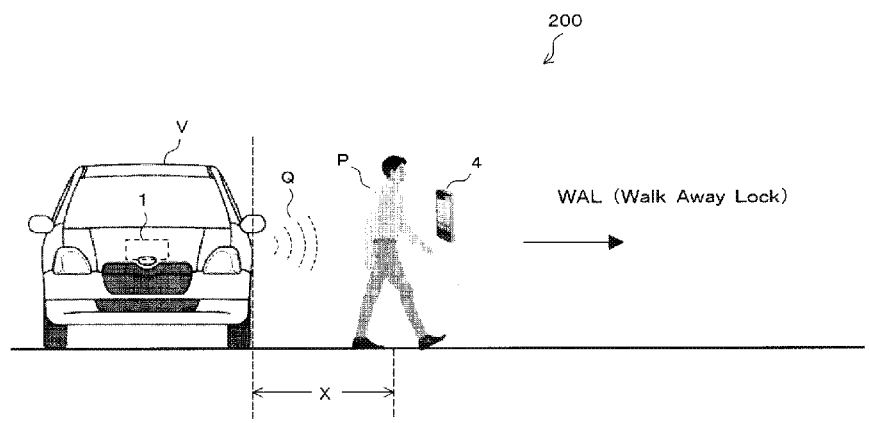
FIGS. 5A and 5B are schematic diagrams of a vehicle control system according to a second embodiment.
Figure 5B:
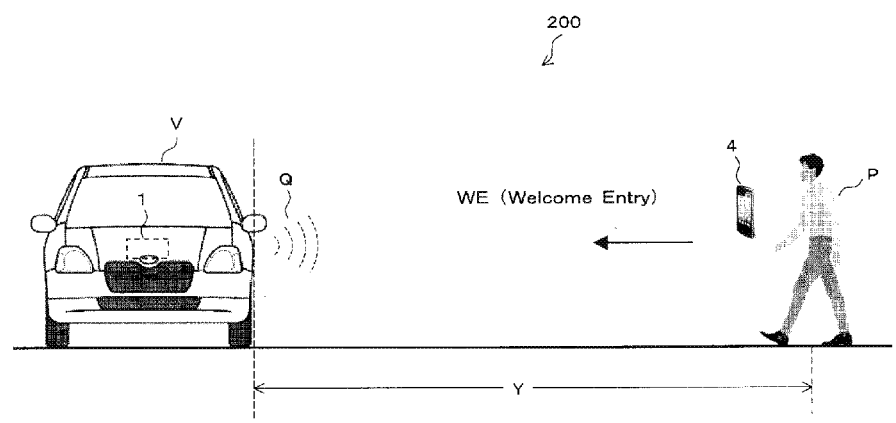

Next, a configuration of a vehicle control system according to a second embodiment will be described with reference to FIGS. 5A and 5B and 6. As shown in FIGS. 5A and 5B, a vehicle control system 200 includes a vehicle control apparatus 1 mounted on a vehicle V; and a smartphone 4 that performs wireless communication with the vehicle control apparatus 1. The smartphone 4 is carried by a user (passenger) P of the vehicle V. In the second embodiment, the smartphone 4 also serves as an electronic key. The smartphone 4 is an example of a "portable device" in one or more embodiments of the disclosure.

FIG. 5A shows a case of WAL (Walk Away Lock) and FIG. 5B shows a case of WE (Welcome Entry). Procedural steps for customizing distance thresholds for the respective cases are basically the same as those for the case of FIGS. 1A and 1B, except that signal transmission and reception modes are changed due to the absence of an electronic key.

Figure 6:
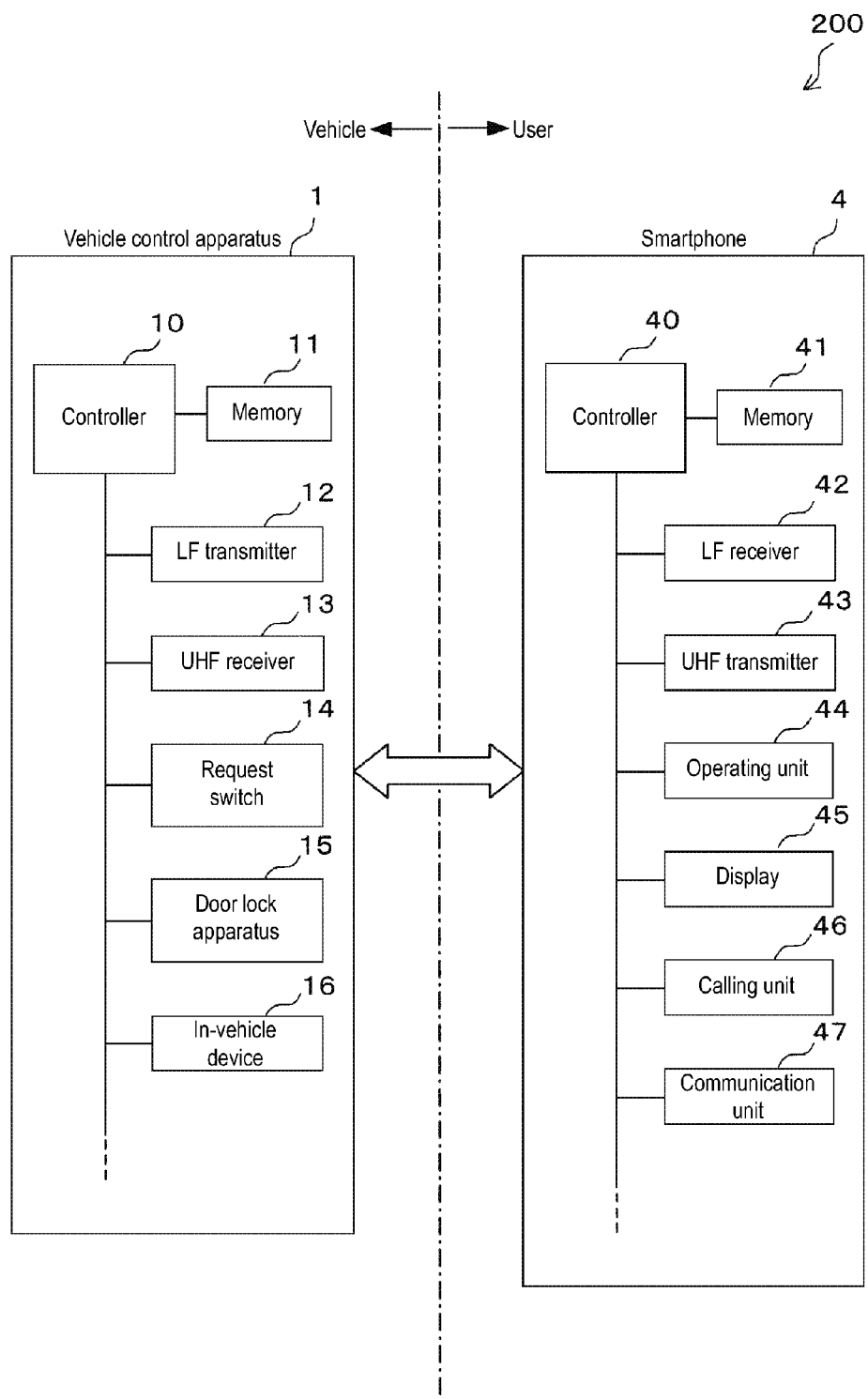
FIG. 6 is a block diagram of the vehicle control system according to the second embodiment.

FIG. 6 shows specific configurations of the vehicle control apparatus 1 and the smartphone 4. The configuration of the vehicle control apparatus 1 is the same as that of FIG. 2 and thus description thereof is omitted. The smartphone 4 includes a controller 40, a memory 41, an LF receiver 42, a UHF transmitter 43, an operating unit 44, a display 45, a calling unit 46, and a communication unit 47. Although the smartphone 4 includes various types of blocks in addition to those, they are not directly related to the disclosure and thus are not shown.

The controller 40 includes a CPU and controls the operation of the smartphone 4. The memory 41 includes memories such as a ROM and a RAM. The LF receiver 42 receives an LF signal Q for distance measurement which is transmitted from the LF transmitter 12 of the vehicle control apparatus 1. The UHF transmitter 43 transmits commands (described later) to the vehicle control apparatus 1 by UHF communication. The operating unit 44 includes operating buttons provided to a main body of the smartphone 4 and operating buttons displayed on the display 45. The display 45 includes, for example, a liquid crystal panel provided to the main body of the smartphone 4 and a drive circuit for the liquid crystal panel. The calling unit 46 includes a speaker, a microphone, an audio circuit, and the like. The communication unit 47 includes a communication circuit that is connected to an Internet line to perform communication with a server, etc.

Figure 7:
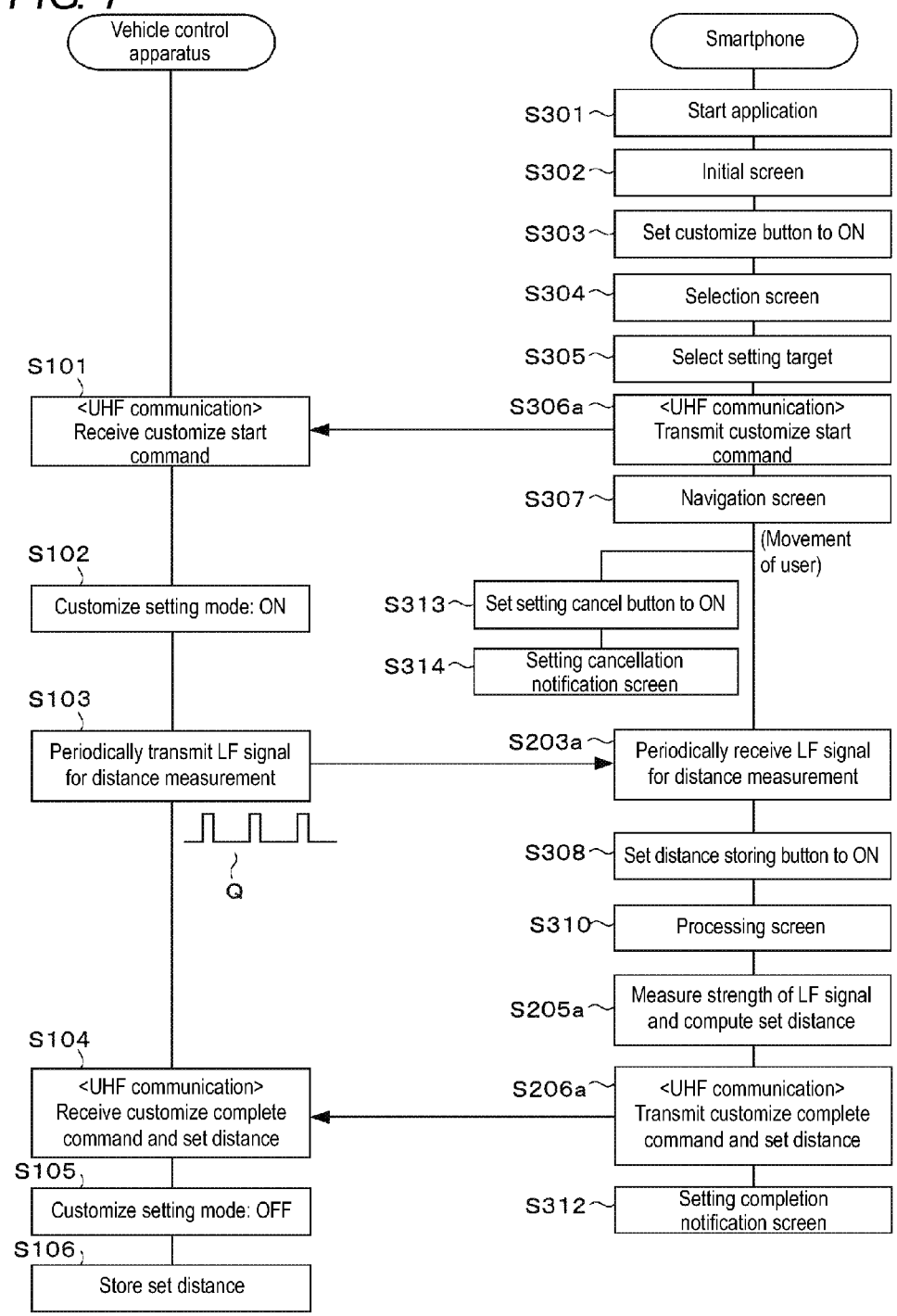
FIG. 7 is a flowchart showing the operation of the vehicle control system according to the second embodiment.

A flowchart of FIG. 7 shows procedural steps for customizing the WAL distance threshold and the WE distance threshold in the vehicle control system 200 configured in the above-described manner. In FIG. 7, those steps that perform the same processes as in FIG. 3 are denoted by the same reference signs.

A series of procedural steps (steps S101 to S106) for the vehicle control apparatus 1 are the same as those for the case of the first embodiment (FIG. 3), and thus, description thereof is omitted. In addition, the procedural steps at S301 to S305, S307, S305, S310, and S312 to S314 for the smartphone 4 are also the same as those for the case of the first embodiment, and thus, description thereof is omitted and only differences from the first embodiment will be described below. Note that screens to be displayed on the display 45 of the smartphone 4 are the same as those shown in FIGS. 4A to 4G, except that those portions related to an electronic key are omitted.

Figure 3:
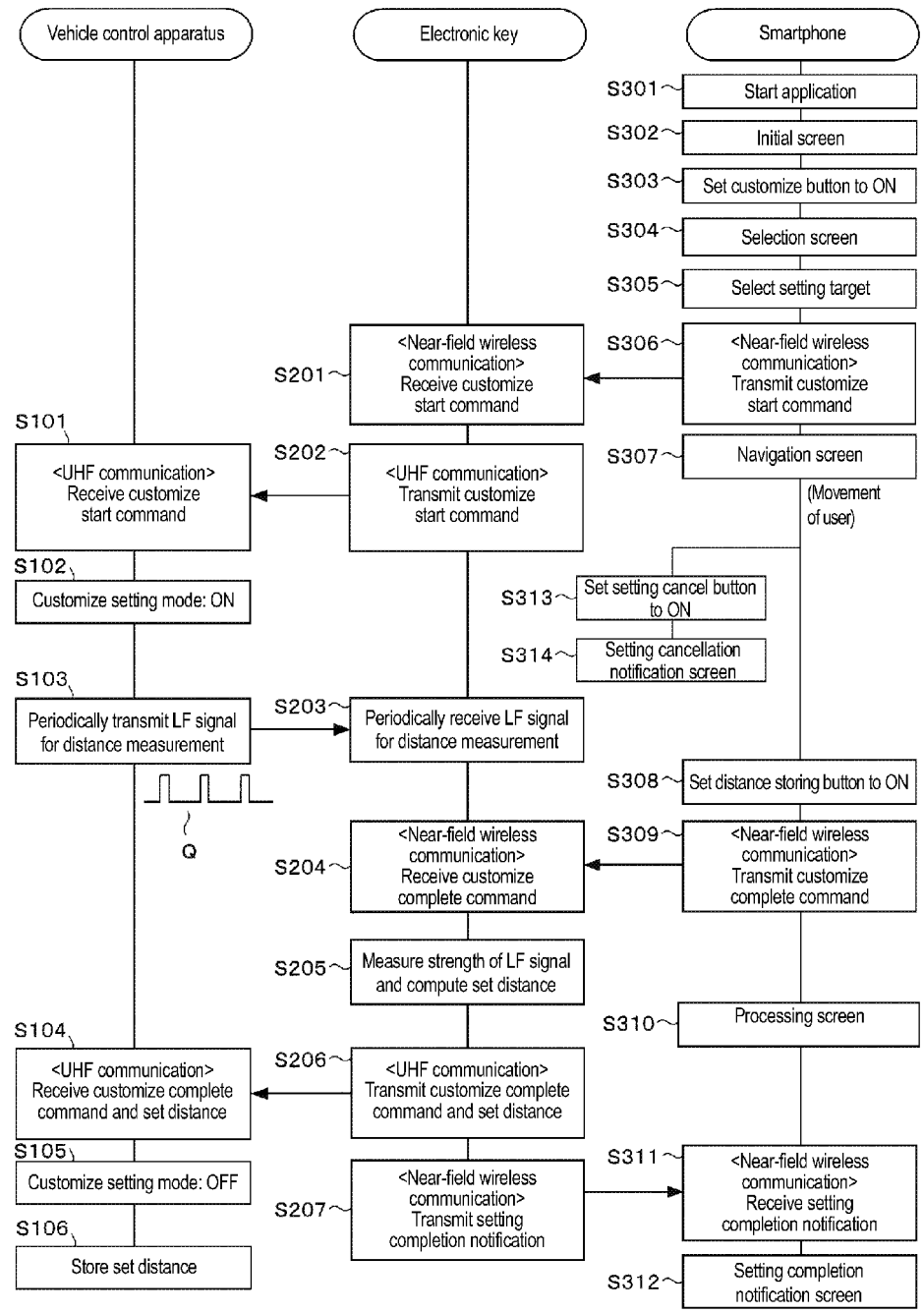
FIG. 3 is a flowchart showing the operation of the vehicle control system according to the first embodiment.

In the first embodiment, a customize start command is transmitted to the electronic key 2 by near-field wireless communication at step S306 of FIG. 3. In the second embodiment, on the other hand, a customize start command is transmitted to the vehicle control apparatus 1 by UHF communication at step S306a of FIG. 7.

In addition, in the first embodiment, the electronic key 2 receives an LF signal Q for distance measurement at step S203 of FIG. 3. In the second embodiment, on the other hand, the smartphone 4 receives an LF signal Q for distance measurement at step S203a of FIG. 7.

In addition, in the first embodiment, a customize complete command is transmitted to the electronic key 2 at step S309 of FIG. 3, and a setting completion notification is received from the electronic key 2 at step S311. In the second embodiment, on the other hand, these steps S309 and S311 are omitted in FIG. 7.

In addition, in the first embodiment, the electronic key 2 measures the strength of an LF signal and computes a set distance at step S205 of FIG. 3. In the second embodiment, on the other hand, the smartphone 4 measures the strength of an LF signal and computes a set distance at step S205a of FIG. 7.

Furthermore, in the first embodiment, the electronic key 2 transmits a customize complete command and a set distance to the vehicle control apparatus 1 at step S206 of FIG. 3. In the second embodiment, on the other hand, the smartphone 4 transmits a customize complete command and a set distance to the vehicle control apparatus 1 at step S208a of FIG. 7.

According to the second embodiment, as in the first embodiment, the WAL distance threshold or the WE distance threshold that meets a user P's wish can be easily set. In addition, since the portable device is only the smartphone 4, the system can be simplified.

Third Embodiment

Figure 8A:
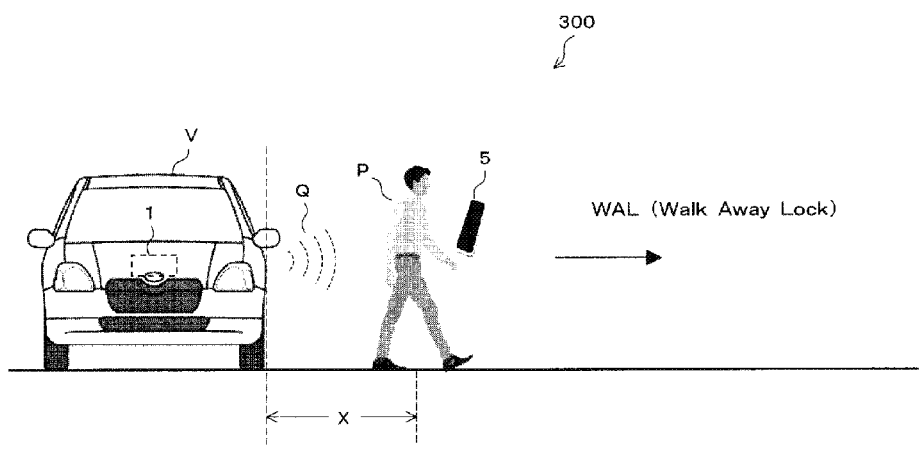
FIGS. 8A and 8B are schematic diagrams of a vehicle control system according to a third embodiment.
Figure 8B:
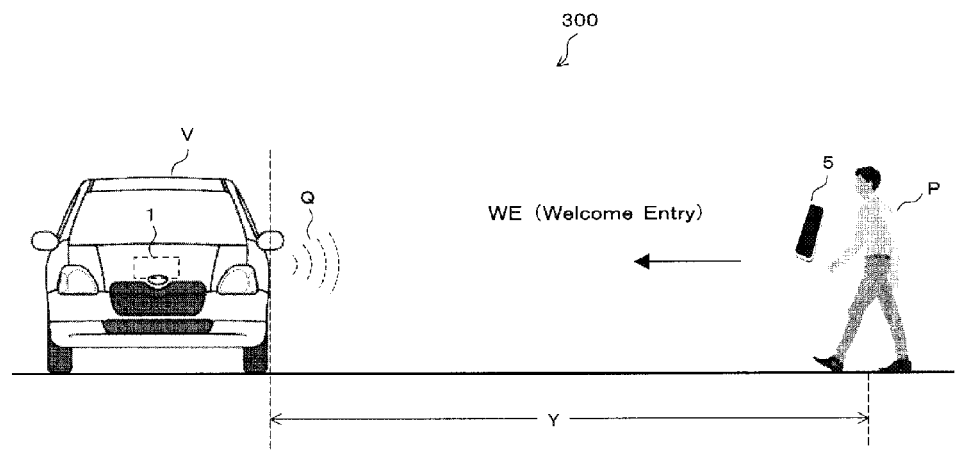

Next, a configuration of a vehicle control system according to a third embodiment will be described with reference to FIGS. 8A and 8B and 9. As shown in FIGS. 8A and 8B, a vehicle control system 300 includes a vehicle control apparatus 1 mounted on a vehicle V; and an electronic key 5 that performs wireless communication with the vehicle control apparatus 1. The electronic key 5 is carried by a user (passenger) P of the vehicle V. In the third embodiment, the electronic key 5 has the function of setting distances. The electronic key 5 is an example of the "portable device" in one or more embodiments of the disclosure.

FIG. 8A shows a case of WAL (Walk Away Lock) and FIG. 8B shows a case of WE (Welcome Entry). Procedural steps for customizing distance thresholds for the respective cases are basically the same as those for the case of FIGS. 1A and 1B, except that signal transmission and reception modes are changed due to the absence of a smartphone.

Figure 9:
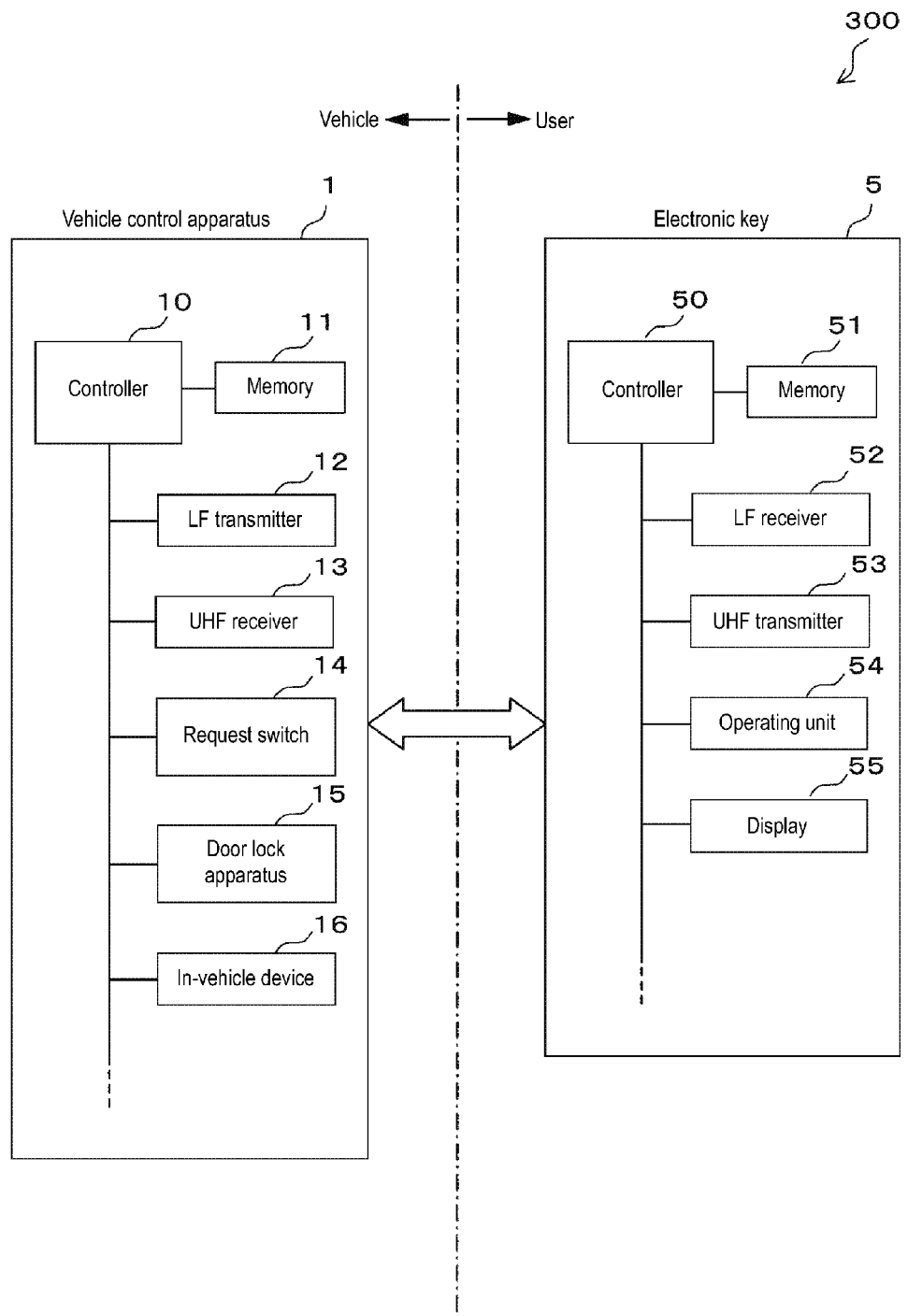
FIG. 9 is a block diagram of the vehicle control system according to the third embodiment.

FIG. 9 shows specific configurations of the vehicle control apparatus 1 and the electronic key 5. The configuration of the vehicle control apparatus 1 is the same as that of FIG. 2 and thus description thereof is omitted. The electronic key 5 includes a controller 50, a memory 51, an LF receiver 52, a UHF transmitter 53, an operating unit 54, and a display 55. Although the electronic key 5 also includes other blocks than those, they are not directly related to the disclosure and thus are not shown.

The controller 50 includes a CPU and controls the operation of the electronic key 5. The memory 51 includes memories such as a ROM and a RAM. The LF receiver 52 receives an LF signal Q for distance measurement which is transmitted from the LF transmitter 12 of the vehicle control apparatus 1. The UHF transmitter 53 transmits the aforementioned customize start command and customize complete command to the vehicle control apparatus 1 by UHF communication. The operating unit 54 includes, for example, a plurality of operating buttons provided to a main body of the electronic key 5. The display 55 includes, for example, a plurality of LED lamps provided to the main body of the electronic key 5.

The vehicle control system 300 of the third embodiment does not use a smartphone and thus screen display is not performed for operations. However, it is possible to allow the user P to perform operations required for customization by using the operating buttons of the operating unit 54 or the LED lamps of the display 55 which are included in the electronic key 5.

Procedural steps for customizing the WAL distance threshold and the WE distance threshold in the vehicle control system 300 configured in the above-described manner are basically the same as those of FIG. 7, except that the smartphone 4 of the second embodiment is replaced by the electronic key 5 and the electronic key 5 does not perform screen display, and can be easily inferred from FIG. 7, and thus, description thereof is omitted.

According to the third embodiment, as in the first embodiment, the WAL distance threshold or the WE distance threshold that meets a user P's wish can be easily set. In addition, since the portable device is only the electronic key 5, as in the second embodiment, the system can be simplified.

Other Embodiments

The disclosure can adopt various embodiments such as those shown below in addition to the above-described ones.

Although a set distance (distance threshold) is stored in the memory 11 of the vehicle control apparatus 1 at step S106 of FIGS. 3 and 7, the set distance (distance threshold) may be stored in the memory 21 of the electronic key 2 or in the memory 31, 41 of the smartphone 3, 4. Alternatively, the set distance (distance threshold) may be stored in both the memory 11 of the vehicle control apparatus 1 and the memory 21 of the electronic key 2, or in both the memory 11 of the vehicle control apparatus 1 and the memory 31, 41 of the smartphone 3, 4.

Although the electronic key 2 computes a set distance at step S205 of FIG. 3, a signal strength measured by the electronic key 2 may be transmitted to the vehicle control apparatus 1 and the vehicle control apparatus 1 may compute a set distance. Likewise, although the smartphone 4 computes a set distance at step S205a of FIG. 7, a signal strength measured by the smartphone 4 may be transmitted to the vehicle control apparatus 1 and the vehicle control apparatus 1 may compute a set distance.

Although the first and second embodiments show the smartphones 3 and 4 as an example of a portable device, instead of a smartphone, for example, other mobile phones or portable tablets may be used as a portable device.

Although the third embodiment shows an example in which instead of operations performed on screens, operations are performed using the operating buttons or LED lamps of the electronic key 5, the display 55 of the electronic key 5 may be composed of a liquid crystal panel so that operations on screens such as those performed on a smartphone can be performed.

Although the setting completion notification screen 33f of FIG. 4F only displays the message Mf indicating the completion of distance setting, in addition to this, the value of a set distance (WAL distance threshold or WE distance threshold) may be displayed.

Although in the above-described embodiments the strength of a second signal received by a portable device is measured and a distance threshold is set based on the signal strength, the distance threshold can also be set by other methods than that. For example, a time difference between the transmission and reception of a second signal may be measured using a TOF (Time of Flight) method, and a distance threshold may be set based on the time difference. Alternatively, a frequency difference between the transmit and receive frequencies of a second signal may be measured by an FM-CW (Frequency Modulated-Continuous Wave) system, and a distance threshold may be set based on the frequency difference. In addition to them, it is also possible to set a distance threshold based on, for example, a phase difference between when a second signal is transmitted and when the second signal is received.

Although the above-described embodiments use only distance thresholds as thresholds for performing locking and unlocking of the doors, the locking and unlocking of the doors may be performed by a combination of a distance threshold and another threshold. For example, a time threshold may be set as another threshold, and when a distance between a portable device and a vehicle is greater than or equal to a distance threshold and the time elapsed from when a user gets out of the vehicle exceeds the time threshold, doors may be locked.

Although the above-described embodiments show the locking and unlocking of the doors as an example of vehicle control performed based on distance thresholds, the configuration is not limited thereto. Turn on/off control of in-vehicle lighting, an air conditioning apparatus, etc., may be performed.

Although the above-described embodiments show vehicle control systems that adopt a keyless entry system or a passive entry system, the disclosure can also be applied to a vehicle control system including only the WAL and WE functions.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control system comprising:
a vehicle control apparatus mounted on a vehicle; and
a portable device carried by a user,
the vehicle control system performing wireless communication between the vehicle control apparatus and the portable device, comparing a distance between the portable device and the vehicle with a predetermined distance threshold, and controlling the vehicle by the vehicle control apparatus based on a result of the comparison, the distance being calculated from a strength of a signal received by the portable device,
wherein the portable device includes a first portable device configured to perform communication with the vehicle control apparatus; and a second portable device configured to perform communication with the first portable device,
wherein the first portable device transmits a first signal to the vehicle control apparatus based on a fact that a first operation by the user is performed on the second portable device, the first signal requesting to transmit a second signal,
wherein when the vehicle control apparatus receives the first signal from the first portable device, the vehicle control apparatus intermittently transmits the second signal to the first portable device,
wherein the first portable device measures a signal strength of the second signal received from the vehicle control apparatus, based on a fact that a second operation by the user is performed on the second portable device after the first operation, and
wherein the vehicle control apparatus or the first portable device sets, as the distance threshold, a distance between the first portable device and the vehicle calculated from the measured signal strength.

2. The vehicle control system according to claim 1,
wherein when the first operation is performed on the second portable device, the second portable device transmits the first signal to the vehicle control apparatus through the first portable device,
wherein when the second operation is performed on the second portable device, the second portable device transmits a third signal to the first portable device, and
wherein when the first portable device receives the third signal from the second portable device, the first portable device measures a signal strength of the second signal.

3. The vehicle control system according to claim 1,
wherein the vehicle control apparatus or the first portable device:
calculates a distance between the first portable device and the vehicle based on the measured signal strength;
sets, as a first distance threshold, a distance between the first portable device and the vehicle obtained at a point in time when the vehicle control apparatus locks a door of the vehicle; and
sets, as a second distance threshold, a distance between the first portable device and the vehicle obtained at a point in time when the vehicle control apparatus unlocks the door of the vehicle.

4. The vehicle control system according to claim 3,
wherein the second portable device includes:
a first selecting portion configured to select setting of the first distance threshold;

a second selecting portion configured to select setting of the second distance threshold;
a first setting portion configured to allow the first distance threshold to be stored; and
a second setting portion configured to allow the second distance threshold to be stored,
wherein the first operation is performed by the first selecting portion or the second selecting portion, and
wherein the second operation is performed by the first setting portion or the second setting portion.

5. The vehicle control system according to claim 1,
wherein the first portable device is an electronic key for locking or unlocking a door of the vehicle, and
wherein the second portable device is a smartphone that performs near-field wireless communication with the first portable device.

6. A vehicle control system comprising:
a vehicle control apparatus mounted on a vehicle; and
a single portable device carried by a user,
the vehicle control system performing wireless communication between the vehicle control apparatus and the portable device, comparing a distance between the portable device and the vehicle with a predetermined distance threshold, and controlling the vehicle by the vehicle control apparatus based on a result of the comparison, the distance being calculated from a strength of a signal received by the portable device,
wherein the portable device transmits a first signal to the vehicle control apparatus based on a fact that a first operation by the user is performed, the first signal requesting to transmit a second signal,
wherein when the vehicle control apparatus receives the first signal from the portable device, the vehicle control apparatus intermittently transmits the second signal to the portable device,
wherein the portable device measures a signal strength of the second signal received from the vehicle control apparatus, based on a fact that a second operation by the user is performed after the first operation, and
wherein the vehicle control apparatus or the portable device sets, as the distance threshold, a distance between the portable device and the vehicle calculated from the measured signal strength.

7. The vehicle control system according to claim 6,
wherein the vehicle control apparatus or the portable device:
calculates a distance between the portable device and the vehicle based on the measured signal strength;
sets, as a first distance threshold, a distance between the portable device and the vehicle obtained at a point in time when the vehicle control apparatus locks a door of the vehicle; and
sets, as a second distance threshold, a distance between the portable device and the vehicle obtained at a point in time when the vehicle control apparatus unlocks the door of the vehicle.

8. The vehicle control system according to claim 7,
wherein the portable device includes:
a first selecting portion configured to select setting of the first distance threshold;
a second selecting portion configured to select setting of the second distance threshold;
a first setting portion configured to allow the first distance threshold to be stored; and
a second setting portion configured to allow the second distance threshold to be stored,
wherein the first operation is performed by the first selecting portion or the second selecting portion, and
wherein the second operation is performed by the first setting portion or the second setting portion.

9. The vehicle control system according to claim 6,
wherein the portable device is a smartphone.

10. The vehicle control system according to claim 6,
wherein the portable device is an electronic key for locking or unlocking a door of the vehicle.

* * * * *